United States Patent
Kennerly et al.

(10) Patent No.: US 11,858,349 B1
(45) Date of Patent: Jan. 2, 2024

(54) HEAD-UP DISPLAY PROVIDING A GAMIFIED EXPERIENCE TO A DRIVER DURING CALIBRATION MODE

(71) Applicant: GM Global Technology Operations LLC, Detroit, MI (US)

(72) Inventors: Guy N. Kennerly, Southfield, MI (US); Kai-Han Chang, Sterling Heights, MI (US); James W. Wells, Rochester Hills, MI (US); Thomas A Seder, Fraser, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 17 days.

(21) Appl. No.: 17/814,654

(22) Filed: Jul. 25, 2022

(51) Int. Cl.
*B60K 35/00* (2006.01)
*G02B 27/01* (2006.01)

(52) U.S. Cl.
CPC .......... *B60K 35/00* (2013.01); *G02B 27/0179* (2013.01); *B60K 2370/785* (2019.05); *G02B 2027/0187* (2013.01)

(58) Field of Classification Search
CPC .............. B60K 35/00; B60K 2370/785; G02B 27/0179; G02B 2027/0187
See application file for complete search history.

(56) References Cited

U.S. PATENT DOCUMENTS

| 2010/0253526 | A1* | 10/2010 | Szczerba | G08B 21/06 340/576 |
| 2017/0169612 | A1* | 6/2017 | Cashen | G06T 19/006 |
| 2017/0349099 | A1* | 12/2017 | Kunze | G02B 27/0101 |
| 2017/0371165 | A1* | 12/2017 | Lambert | G02B 27/0179 |
| 2019/0278094 | A1* | 9/2019 | Huang | G02B 27/0093 |
| 2022/0281317 | A1* | 9/2022 | Ahn | G06T 5/006 |
| 2023/0073986 | A1* | 3/2023 | Kuang | B60W 50/0098 |
| 2023/0291879 | A1* | 9/2023 | Chang | H04N 9/3152 348/744 |

* cited by examiner

*Primary Examiner* — Dmitriy Bolotin
(74) *Attorney, Agent, or Firm* — Vivacqua Crane, PLLC (57) ABSTRACT

A head-up display system for displaying graphics upon a windscreen of a vehicle to provide a driver with a gamified experience includes a driver monitoring system including one or more cameras that determine a location of a head of the driver of the vehicle and an eye location of the driver, a graphic projection module for generating images upon the windscreen of the vehicle, and one or more controllers in electronic communication with the driver monitoring system and the graphic projection module. The controller executes instructions to instruct the graphic projection module to generate a vertical alignment graphic upon the windscreen of the vehicle. The vertical alignment graphic indicates when the eye location of the driver is positioned at a nominal height of an eyebox of the head-up display.

20 Claims, 8 Drawing Sheets

HEAD-UP DISPLAY PROVIDING A GAMIFIED EXPERIENCE TO A DRIVER DURING CALIBRATION MODE

INTRODUCTION

The present disclosure relates to a head-up display that provides a gamified experience to a driver during calibration mode.

A head-up display (HUD) shows information such as, for example, vehicle speed and navigational instructions, directly onto a windscreen of a vehicle, within the driver's forward field of view. Accordingly, the head-up display provides drivers with information without looking away from the road. In some instances, head-up displays may be employed in augmented reality displays that overlay images on the windscreen to enhance a driver's view of the environment outside the vehicle and require precision alignment of the images relative to the driver.

The head-up display is calibrated at the manufacturer with the assumption that the head-up display will be installed into an ideal vehicle having an ideal windscreen shape. The head-up display is then sent to the final assembly plant, where the head-up display is installed into a vehicle. Although the head-up display has already been calibrated at the manufacturer, the head-up display requires re-boresighting and an updated distortion map at the vehicle level. This is necessitated because of build variations within the vehicle as well as variations with windscreen shape. However, re-boresighting and creating an updated distortion map at the assembly plant is costly and also increases cycle time.

Thus, while current approaches to calibrate a head-up display achieve their intended purpose, there is a need in the art for an improved, cost-effective approach for calibrating a head-up display.

SUMMARY

According to several aspects, a head-up display system for displaying graphics upon a windscreen of a vehicle to provide a driver with a gamified experience is disclosed. The head-up display system includes a driver monitoring system including one or more cameras that determine a location of a head of the driver of the vehicle and an eye location of the driver, a graphic projection module for generating images upon the windscreen of the vehicle, and one or more controllers in electronic communication with the driver monitoring system and the graphic projection module. The controller executes instructions to receive a user-generated prompt indicating a calibration mode of the head-up display system is initiated. In response to receiving the user-generated prompt, the one or more controllers initiate the calibration mode. The one or more controllers receive an eye location indicator from the driver monitoring system indicating the eye location of the driver and determine the eye location of the driver. The one or more controllers instruct the graphic projection module to generate a vertical alignment graphic upon the windscreen of the vehicle. The vertical alignment graphic indicates when the eye location of the driver is positioned at a nominal height of an eyebox of the head-up display.

In an aspect, the vertical alignment graphic is a horizontally aligned arrow that changes color to indicate when the eye location of the driver is at the nominal height of the eyebox.

In another aspect, the one or more controllers execute instructions to in response to determining the eye location of the driver is at the nominal height of the eyebox, generate a horizontal alignment graphic upon the windscreen of the vehicle based on the eye location of the driver.

In yet another aspect, the horizontal alignment graphic indicates when the eye location of the driver is positioned at a horizontally oriented center of the eyebox.

In an aspect, the one or more controllers execute instructions to instruct the graphic projection module to generate a boresight graphic upon the windscreen of the vehicle, where the boresight graphic includes a curved underside profile that follows a curvature of a steering wheel.

In another aspect, the boresight graphic includes one or more arrows that indicate a direction in that the boresight graphic is to be moved to in order to align the curved underside profile of the boresight graphic with the curvature of the steering wheel.

In yet another aspect, the boresight graphic changes color to indicate when the eye location of the driver is not at a horizontally oriented center of the eyebox.

In an aspect, the one or more controllers execute instructions to instruct the graphic projection module to generate one or more distortion graphics upon the windscreen of the vehicle.

In another aspect, the head-up display system further includes a head-down display including a screen, where the head-down display is in electronic communication with the one or more controllers.

In yet another aspect, the one or more controllers execute instructions to instruct the head-down display to display one or more calibration controls upon the screen.

In an aspect, the driver performs distortion compensation adjustment by adjusting a shape of a distortion graphic to remove distortions by manipulating the one or more calibration controls.

In another aspect, the driver performs distortion compensation on more than one distortion graphic.

In yet another aspect, the one or more controllers execute instructions to determine a distortion compensation value based on distortion parameters corresponding to each distortion graphic.

In an aspect, the more than one distortion graphic includes one or more of the following: a trapezium distortion graphic, a cushion distortion graphic, a smile distortion graphic, a shear distortion graphic, an asymmetrical shear horizontal right distortion graphic, an asymmetrical cushion horizontal right distortion graphic, an asymmetrical shear horizontal left distortion graphic, and an asymmetrical cushion horizontal left distortion graphic.

In another aspect, the one or more controllers execute instructions to determine a reward that is assigned to the driver for completing calibration of the head-up display system, where the reward is in the form of brand incentive points.

In an aspect, a vehicle includes a windscreen and a head-up display system for displaying graphics upon the windscreen of a vehicle to provide a driver with a gamified experience. The head-up display system comprises a driver monitoring system including one or more cameras that determine a location of a head of the driver of the vehicle and an eye location of the driver, a graphic projection module for generating images upon the windscreen of the vehicle, and one or more controllers in electronic communication with the driver monitoring system and the graphic projection module. The controller executes instructions to receive a user-generated prompt indicating a calibration mode of the head-up display system is initiated. In response to receiving the user-generated prompt, the one or more controllers initiate the calibration mode. The one or more controllers receive an eye location indicator from the driver monitoring system indicating the eye location of the driver and determine the eye location of the driver. The one or more controllers instruct the graphic projection module to generate a vertical alignment graphic upon the windscreen of the vehicle, where the vertical alignment graphic indicates when the eye location of the driver is positioned at a nominal height of an eyebox of the head-up display.

In an aspect, a method for displaying graphics upon a windscreen of a vehicle by a head-up display system to provide a driver with a gamified experience is disclosed. The method includes receiving, by one or more controllers, a user-generated prompt indicating a calibration mode of the head-up display system is initiated. In response to receiving the user-generated prompt, the method includes initiating the calibration mode. The method includes receiving, by the controller, an eye location indicator from a driver monitoring system indicating an eye location of the driver and determining the eye location of the driver. The driver monitoring system includes one or more cameras that determine the location of a head of the driver of the vehicle and the eye location of the driver. The method includes instructing a graphic projection module to generate a vertical alignment graphic upon the windscreen of the vehicle, where the vertical alignment graphic indicates when the eye location of the driver is positioned at a nominal height of an eyebox of the head-up display. Finally, in response to determining the eye location of the driver is at the nominal height of the eyebox, the method includes generating a horizontal alignment graphic upon the windscreen of the vehicle based on the eye location of the driver.

In another aspect, the method includes instructing the graphic projection module to generate a boresight graphic upon the windscreen of the vehicle. The boresight graphic includes a curved underside profile that follows a curvature of a steering wheel.

In yet another aspect, the method includes instructing the graphic projection module to generate one or more distortion graphics upon the windscreen of the vehicle.

In an aspect, the method includes determining a reward that is assigned to the driver for completing calibration of the head-up display system, where the reward is in the form of brand incentive points.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
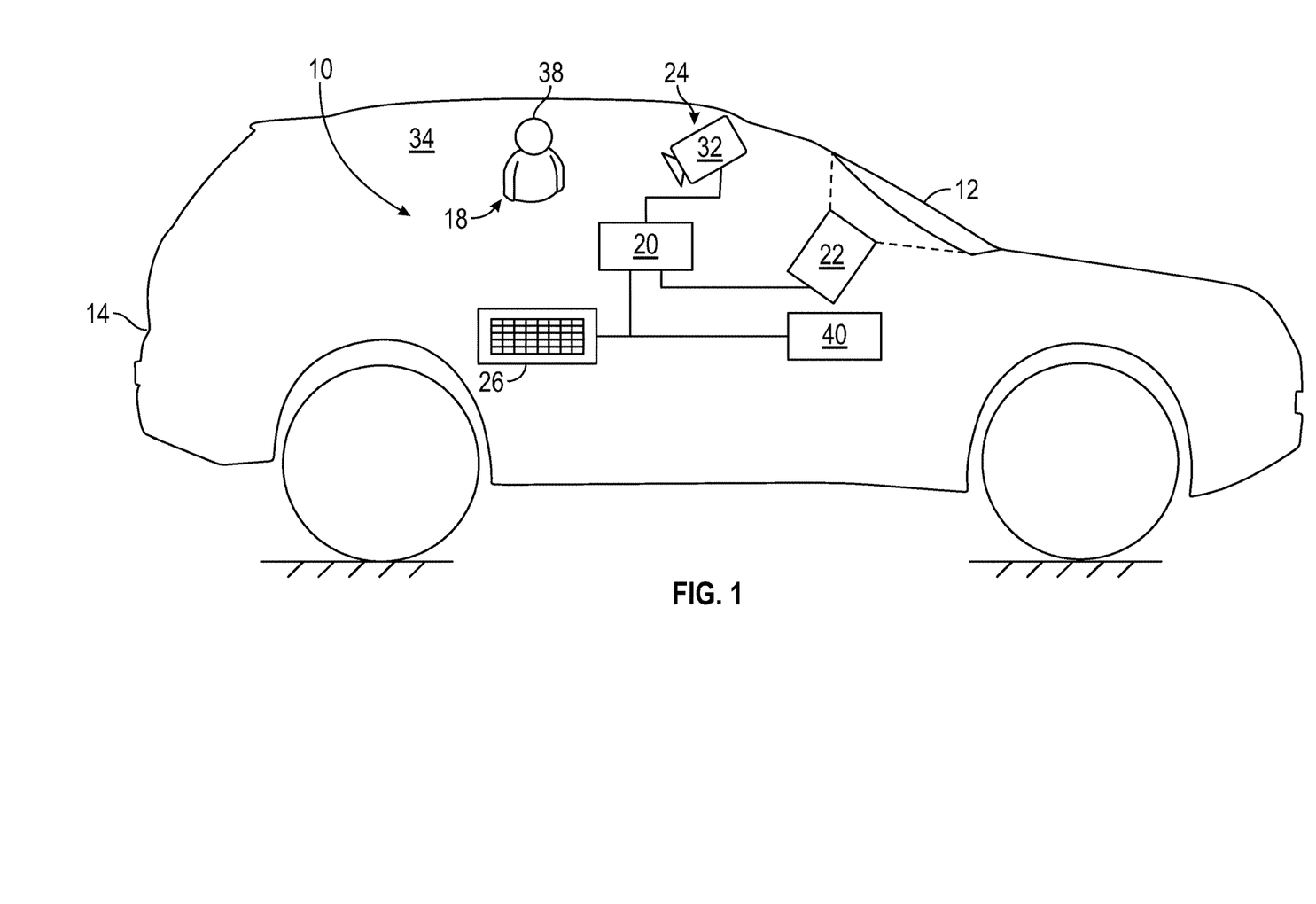
FIG. 1 is a schematic diagram of the disclosed head-up display system that provides a gamified experience to a driver during calibration mode, according to an exemplary embodiment.

Referring to FIG. 1, an exemplary head-up display system 10 is shown. The head-up display system 10 displays graphics upon a windscreen 12 of a vehicle 14 to provide a driver 18 with a gamified experience during calibration of the head-up display system 10. The head-up display system 10 includes one or more controllers 20 in electronic communication a graphic projection module 22, a driver monitoring system 24, and a user input device 26. The graphic projection module 22 is configured to generate images upon the windscreen 12 of the vehicle 14 and includes a projection device for creating an excitation light for projecting images. The driver monitoring system 24 includes one or more cameras 32 located within an interior cabin 34 of the vehicle 14 for determining the location of a head 38 of the driver 18 of the vehicle 14 as well as an eye location of the driver 18. In the example as shown in FIG. 1, the user input device 26 is a keyboard, however, it is to be appreciated that other user input devices such as, but not limited to, a microphone may be used as well. The one or more controllers 20 are also in electronic communication with a head-down display 40, which may be located alongside or below an instrument panel 42 (seen in FIGS. 2A and 2B) located within the interior cabin 34 of the vehicle 14. It is to be appreciated that the vehicle 14 may be any type of vehicle such as, but not limited to, a sedan, truck, sport utility vehicle, van, or motor home.

Figure 2A:
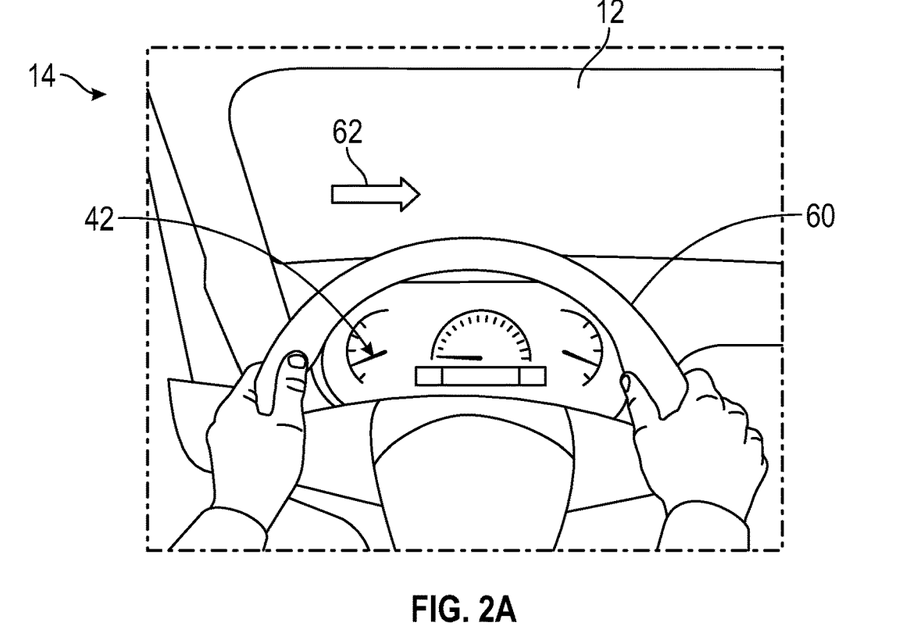
FIGS. 2A and 2B illustrate the head-up display system operating in the calibration mode to ensure that an eye location of a driver is centered within an eyebox, according to an exemplary embodiment.
Figure 2B:
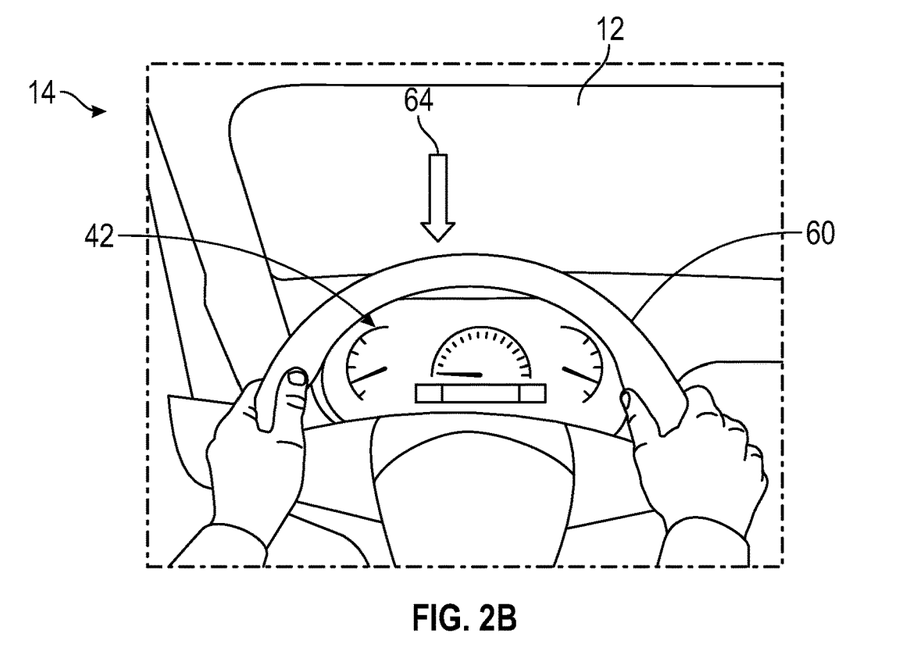

FIGS. 2A-2B are an exemplary interior view of the windscreen 12, where the head-up display system 10 is operating in a calibration mode to ensure that the eye location of the driver 18 (FIG. 1) is centered within an eyebox 50 (seen in FIG. 3) of the head-up display system 10. As explained below, during the calibration mode the head-up display system 10 first ensures that the eye location of the driver 18 is centered within the eyebox 50. Once the eye location of the driver 18 is centered within the eyebox 50, the head-up display system 10 is boresighted and a calibration map is calculated to account for build variations within the vehicle 14 and variations with the shape of the windscreen 12. It is to be appreciated that the head-up display system 10 does not require calibration at a final assembly plant. Instead, the head-up display system 10 may be calibrated at a dealership or by a customer, without the need for special equipment.

Figure 3:
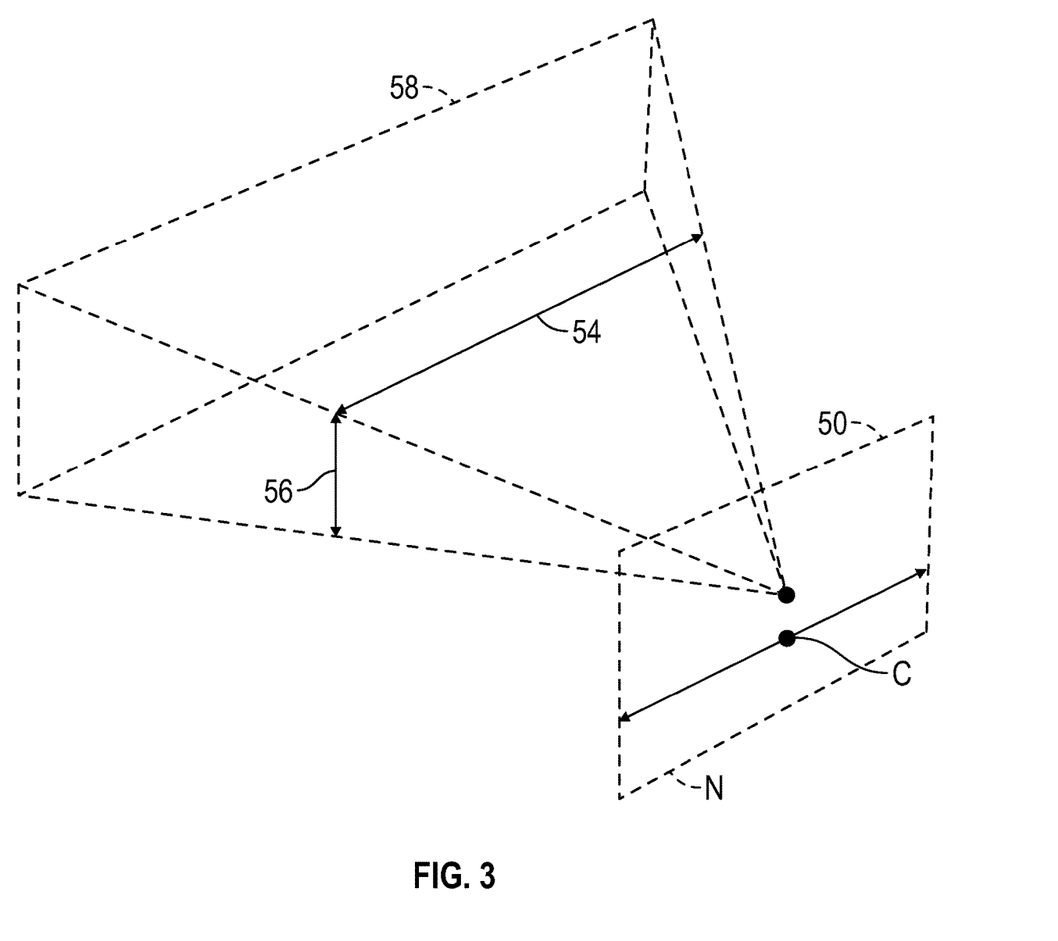
FIG. 3 is an illustration of the eyebox of the head-up display, according to an exemplary embodiment.

FIG. 3 is a schematic diagram illustrating the eyebox 50 of the head-up display system 10. Referring to both FIGS. 1 and 3, a horizontal field-of-view 54 and a vertical field-of-view 56 define a display size 58 of the head-up display system 10, where the display size 58 represents an area where the head-up display system 10 generates graphic images. The eyebox 50 is the volume within the interior cabin 34 of the vehicle 14 in which the head 38 of the driver 18 may view the entire display size 58 of the head-up display system 10.

Referring to FIGS. 1 and 2A, the calibration mode of the head-up display system 10 is initiated by receiving a user-generated prompt. For example, the driver 18 may initiate the calibration mode by entering input using the user input device 26. Upon entering the calibration mode, the driver 18 then adjusts a position of a steering wheel 60 of the vehicle 14 into an upmost position. The one or more controllers 20 receive the user-generated prompt, which indicates the calibration mode of the head-up display system 10 is initiated. In response to receiving the user-generated prompt, the one or more controllers 20 initiate the calibration mode and receive an eye location indicator from the driver monitoring system 24 indicating the eye location of the driver 18. The one or more controllers determine the eye location of the driver 18 based on the eye location indicator received from the driver monitoring system 24. The one or more controllers 20 then instruct the graphic projection module 22 to generate a vertical alignment graphic 62 upon the windscreen 12 of the vehicle 14 based on the eye location of the driver 18. The vertical alignment graphic 62 indicates when the eye location of the driver 18 is positioned at a nominal height N of the eyebox 50 (seen in FIG. 3) of the head-up display system 10.

In the example as shown in FIG. 2A, the vertical alignment graphic 62 is a horizontally aligned arrow that changes color to indicate when the eye location of the driver 18 is at the nominal height N of the eyebox 50 (FIG. 3). Specifically, in one non-limiting embodiment, the vertical alignment graphic 62 is colored red to indicate that the eye location of the driver 18 is outside of the eyebox 50, and changes to yellow as the driver 18 adjusts his or her vertical height within the interior cabin 34 of the vehicle 14 and moves closer towards the nominal height N of the eyebox 50. The driver 18 may adjust his or her vertical height by adjusting a height of his or her seat. Once the eye location of the driver 18 is within the eyebox 50, the vertical alignment graphic 62 turns green. It is to be appreciated that while an arrow is illustrated, other types of graphics may be used as well such as, for example, text indicating instructions.

Referring to FIGS. 1 and 2B, once the driver 18 has adjusted his or her vertical height and the eye location is at the nominal height N of the eyebox 50 (FIG. 3), the one or more controllers 20 then generate a horizontal alignment graphic 64 upon the windscreen 12 of the vehicle 14 based on the eye location of the driver 18. The horizontal alignment graphic 64 indicates when the eye location of the driver 18 is positioned at a horizontally oriented center C of the eyebox 50 (seen in FIG. 3) of the head-up display system 10. In the non-limiting embodiment as shown in FIG. 2B, the horizontal alignment graphic 64 is a vertically aligned arrow that changes color to indicate when the eye location of the driver 18 is at the horizontally oriented center C of the eyebox 50 (FIG. 3). For example, the horizontal alignment graphic 64 is colored red to indicate that the eye location of the driver 18 not at the horizontally oriented center C of the eyebox 50, and changes to yellow as the driver 18 approaches the horizontally oriented center C of the eyebox 50, and turns green once the eye location of the driver 18 is at the horizontally oriented center C of the eyebox 50.

Figure 4A:
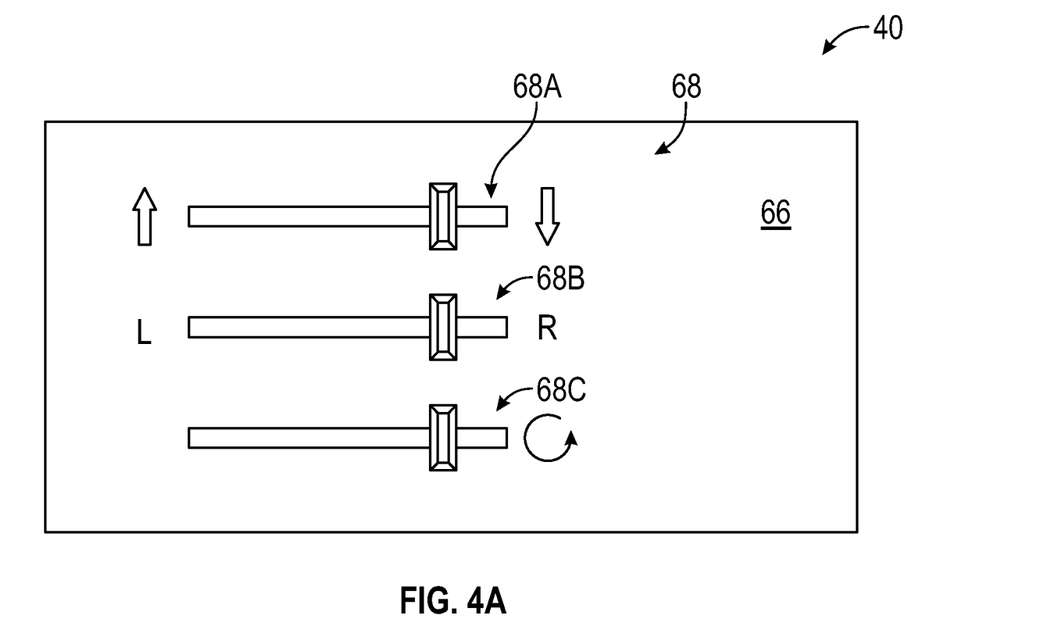
FIG. 4 illustrates a head-down display showing one or more boresighting controls, according to an exemplary embodiment.
Figure 5A:
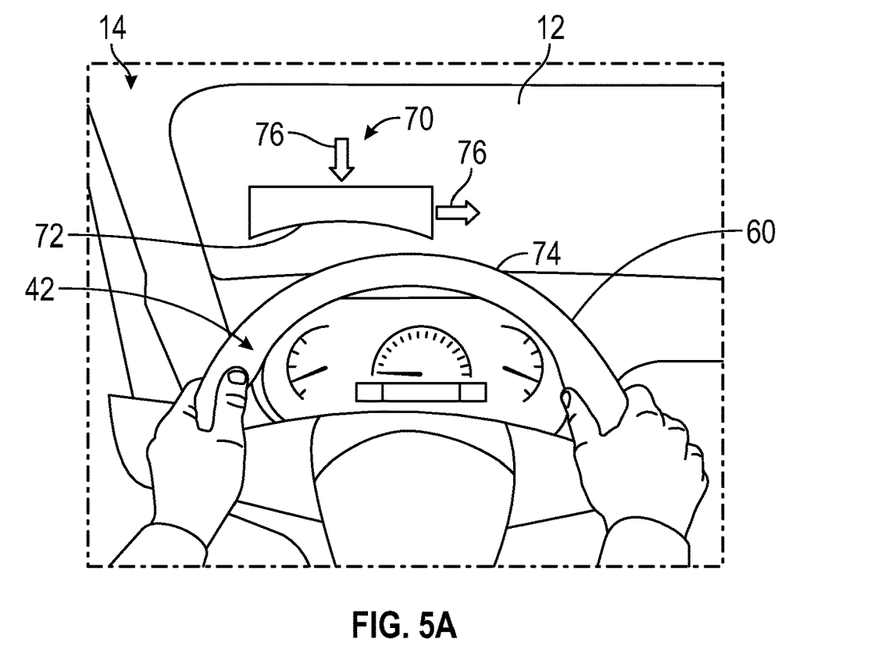
FIGS. 5A and 5B illustrate the head-up display system operating in the calibration mode and generating a boresighting graphic, according to an exemplary embodiment.
Figure 5B:
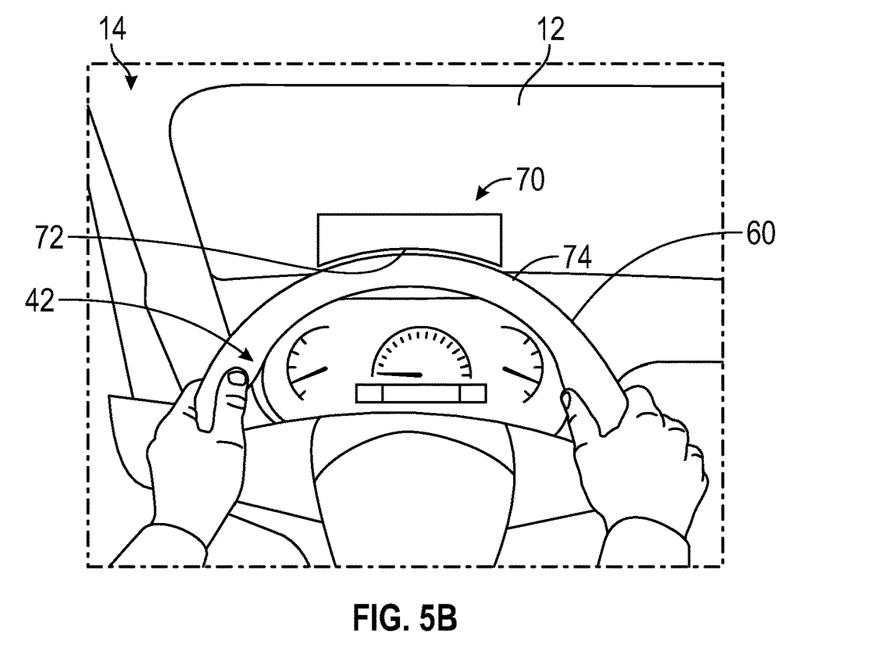

Once the eye location of the driver 18 is within the eyebox 50 (FIG. 3), the driver 18 may select various options shown upon the head-down display 40 to display one or more boresighting controls 68 upon a screen, which is shown in FIG. 4A. In the example as shown in FIG. 4A, the boresighting controls 68 include an up/down slider 68A, a left-right slider 68B, and a rotational slider 68C, however, it is to be appreciated that other controls may be used as well. Moreover, in another embodiment the boresighting controls 68 may be implemented as voice or gesture controls instead. Referring to FIGS. 1 and 5A, the one or more controllers 20 then instruct the graphic projection module 22 to generate a boresight graphic 70 upon the windscreen 12 of the vehicle 14. The boresight graphic 70 includes a curved underside profile 72 that follows a curvature 74 of the steering wheel 60. The boresight graphic 70 also includes one or more arrows 76. The arrows 76 indicate the direction in that the boresight graphic 70 is to be moved to in order to align the curved underside profile 72 of the boresight graphic 70 with the curvature 74 of the steering wheel 60, which is shown in FIG. 5B. In the example as shown in FIG. 5A, the arrow 76 indicates the boresight graphic 70 is to be moved to the right and down in order to align with the curvature 74 of the steering wheel 60.

In one embodiment, the boresight graphic 70 changes color to indicate when the eye location of the driver 18 is not at the horizontally oriented center C of the eyebox 50, or at the nominal height N of the eyebox 50 (FIG. 3). For example, in one embodiment, the boresight graphic 70 is colored yellow to indicate the eye location of the driver 18 is not at the horizontally oriented center C or the nominal height N of the eyebox 50, but changes to green once the driver 18 moves his or head to change his or her eye location to align with the horizontally oriented center C or the nominal height N of the eyebox 50.

Once the curved underside profile 72 of the boresight graphic is aligned with the curvature 74 of the steering wheel 60, the one or more controllers 20 save one or more boresight parameters in memory. It is to be appreciated that original x, y coordinates of the head-up display system 10 that are determined during factory calibration are stored in the memory of the one or more controllers 20, and the boresight parameters include offset values x', y' for the head-up display system 10 that is boresighted at the vehicle level, where the offset values x', y' replace the original x, y coordinates of the head-up display system 10. The one or more controllers 20 then instruct the graphic projection module 22 to generate a graphic instructing the driver 18 to move the steering wheel 60 downwards from the upmost position.

Figure 4B:
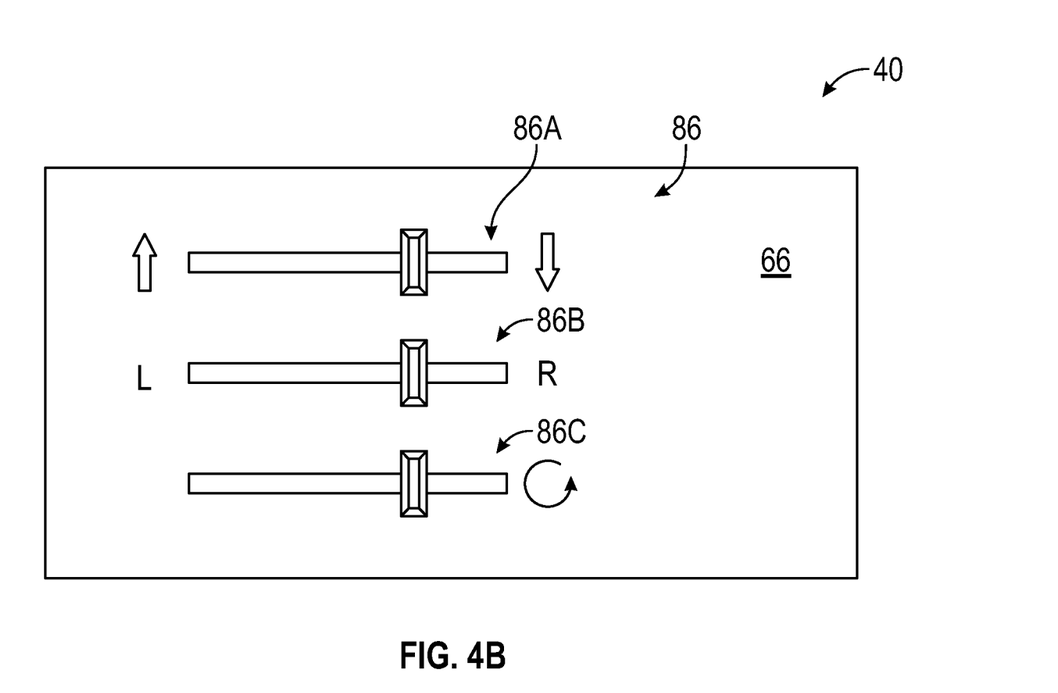
Figure 6:
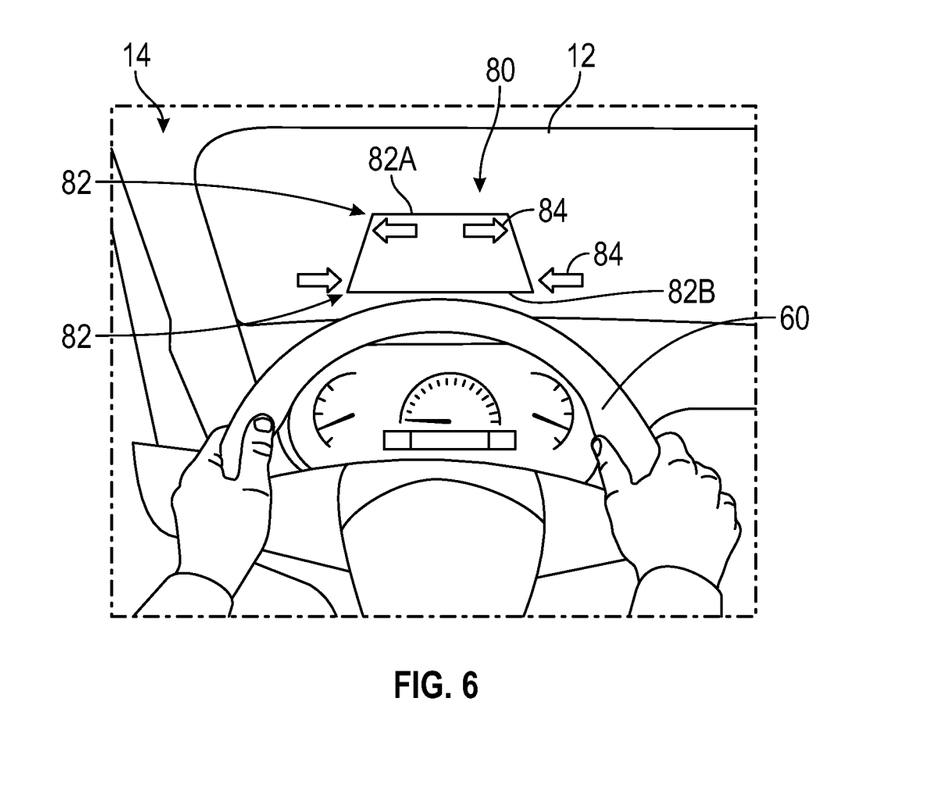
FIG. 6 illustrates the head-up display system operating in the calibration mode and generating an exemplary distortion graphic, according to an exemplary embodiment.
Figure 7:
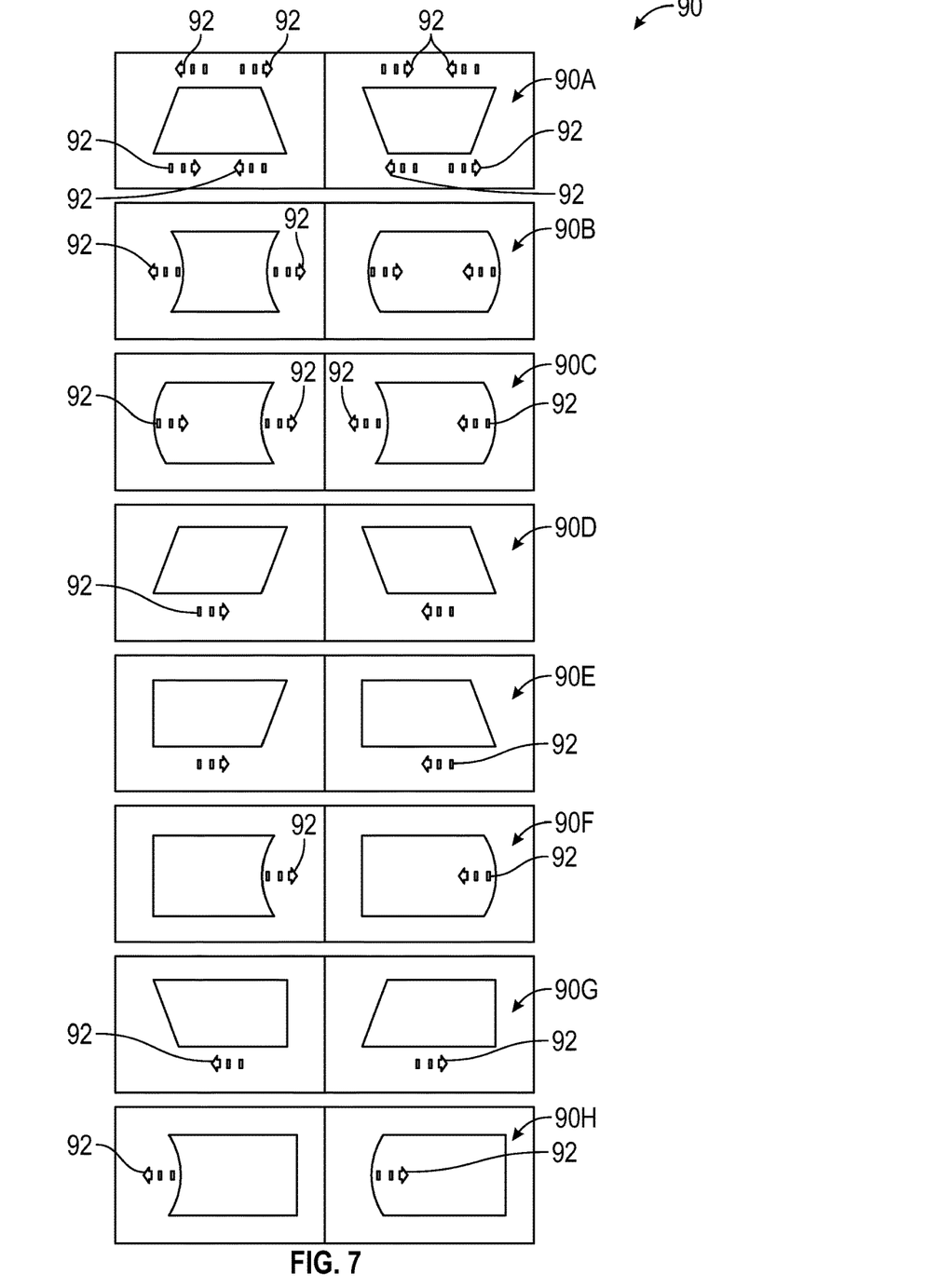
FIG. 7 illustrates a menu of different distortion graphics that may be used during the calibration mode, according to an exemplary embodiment.

Referring now to FIG. 6, the one or more controllers 20 then instruct the graphic projection module 22 to generate one or more distortion graphics 80 upon the windscreen 12 of the vehicle 14, where the distortion graphics 80 are adjusted by the driver 18 to compensate for distortion that is created by variations in a shape of the windscreen 12. In the example as shown in FIG. 6, the distortion graphic 80 is a trapezium, however, as seen in FIG. 7 and as described below other types of graphics may be used as well. The one or more controllers 20 also instruct the head-down display 40 to generate one or more calibration controls 86, which are shown in FIG. 4B, for adjusting a distortion of the distortion graphic 80 displayed upon the windscreen 12 of the vehicle 14. In the example as shown in FIG. 4B, the one or more calibration controls 86 include an up/down slider 86A, a left-right slider 86B, and a rotational slider 86C.

In the example as shown in FIG. 6, the distortion of the trapezium distortion graphic 80 may be adjusted along both parallel sides 82. Specifically, an upper parallel side 82A may be adjusted in an outward direction and a lower parallel side 82B may be adjusted in an inwards direction as indicated by arrows 84. However, in another embodiment, the upper parallel side 82A may be adjusted in the inward direction and the lower parallel side 82B may be adjusted in the outward direction. Referring to FIGS. 1, 4B, and 6, the driver 18 performs distortion compensation adjustment by adjusting a shape of the distortion graphic 80 to remove distortions that are introduced by variations in the windscreen 12 shape by manipulating the one or more calibration controls 86. Once the distortions are removed from the distortion graphic 80, the shape of the distortion graphic 80 is finalized and translated into one or more distortion parameters. In an embodiment, as the driver 18 performs the distortion compensation adjustment, the distortion graphic 80 changes color to indicate when the eye location of the driver 18 is not at the horizontally oriented center C or the nominal height N of the eyebox 50 (FIG. 3).

Although FIG. 6 illustrates a trapezium for distortion compensation, it is to be appreciated that other types of projection distortion may be corrected too. In an embodiment, the driver 18 may correct more than one type of projection distortion. FIG. 7 is an exemplary menu including several different types of distortion graphics 90. In the example as shown in FIG. 7, the distortion graphics 90 include a trapezium distortion graphic 90A, a cushion distortion graphic 90B, a smile distortion graphic 90C, a shear distortion graphic 90D, an asymmetrical shear horizontal right distortion graphic 90E, an asymmetrical cushion horizontal right distortion graphic 90F, an asymmetrical shear horizontal left distortion graphic 90G, and an asymmetrical cushion horizontal left distortion graphic 90H. The arrows 92 shown in FIG. 7 illustrate a direction of adjustment of the distortion graphic 90.

Once the driver 18 performs the distortion compensation adjustment on the one or more distortion graphics 80, the one or more controllers 20 determine a distortion compensation value based on the distortion parameters corresponding to each distortion graphic 80. The distortion compensation value is a two-dimensional matrix that includes distortion compensation values for each distortion graphic 80 that is adjusted by the driver 18. It is to be appreciated that the distortion compensation value replaces an original two-dimensional matrix saved in memory of the one or more controllers 20, where the original two-dimensional matrix is used to compensate for distortion that is introduced by the optical components of the head-up display system 10. The one or more controllers 20 may then calculate the calibration map based on the distortion compensation value. The distortion compensation map yields a shaped or pre-distorted image that accounts for variations in the shape of the windscreen 12, where the pre-distorted image is then projected upon the windscreen 12 by the graphic projection module 22.

Once the distortion compensation map is calculated, the calibration is complete and the one or more controllers 20 then determine a reward that is assigned to the driver 18 for completing the calibration of the head-up display system 10. The reward may be in the form of brand incentive points that the driver 18 may redeem in exchange for good or services. The one or more controllers 20 instruct the graphic projection module 22 to generate an image notifying the driver 18 of the reward. It is to be appreciated that awarding brand incentive points provides a gamified experience that motivates and engages the driver.

Figure 8:
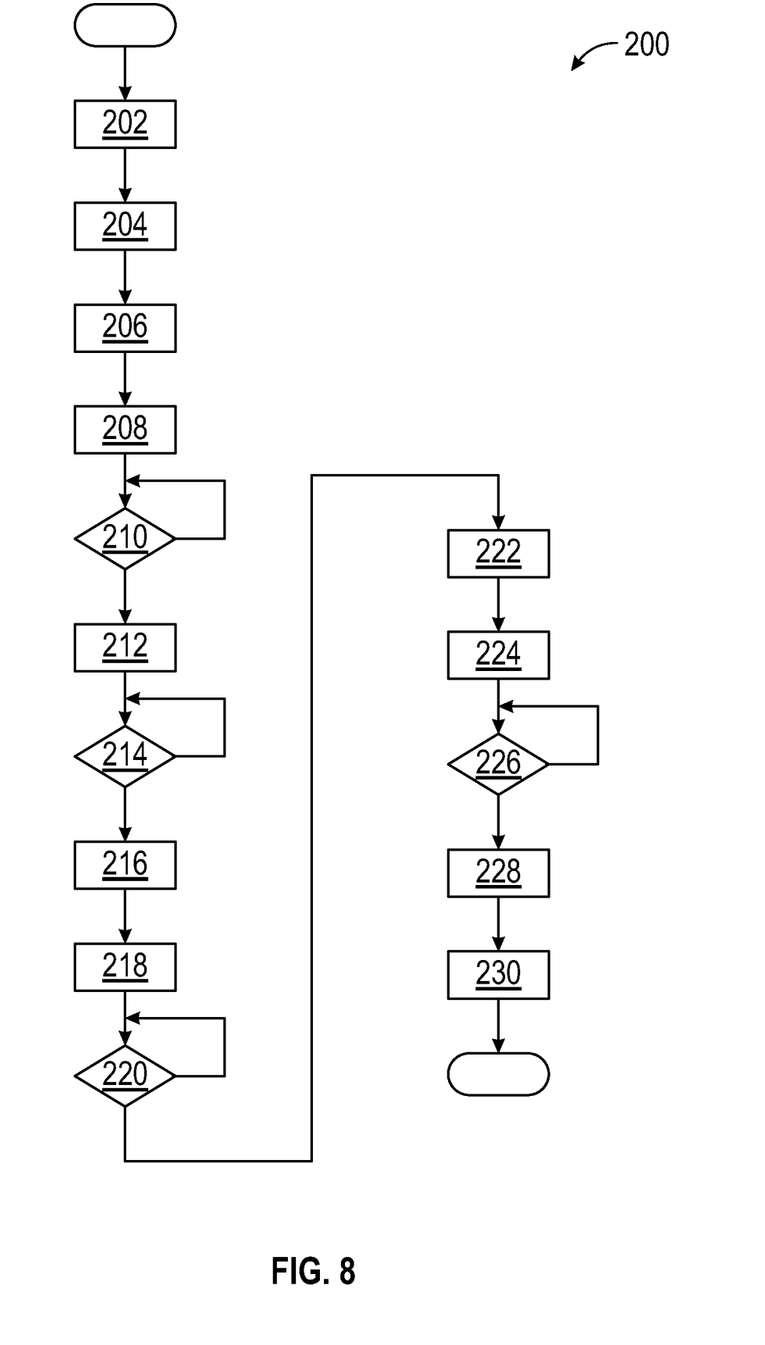
FIG. 8 is a process flow diagram illustrating a method for providing a gamified experience to the driver while calibrating the head-up display, according to an exemplary embodiment.

FIG. 8 is a process flow diagram illustrating a method 200 of providing a gamified experience to the driver 18 while calibrating the head-up display system 10. Referring to FIGS. 1 and 8, the method 200 may begin at block 202. In block 202, the calibration mode of the head-up display system 10 is initiated by receiving a user-generated prompt. For example, the driver 18 may initiate the calibration mode by entering input into the user input device 26. The method 200 may then proceed to block 204.

In block 204, upon entering the calibration mode, the driver 18 adjusts a position of a steering wheel 60 of the vehicle 14 (seen in FIGS. 2A and 2B) into the upmost position. The method 200 may then proceed to block 206.

In block 206, in response to receiving the user-generated prompt, the one or more controllers 20 initiate the calibration mode and receive an eye location indicator from the driver monitoring system 24 indicating the eye location of the driver 18. The one or more controllers 20 determine the eye location of the driver 18 based on the eye location indicator received from the driver monitoring system 24. The method 200 may then proceed to block 208.

In block 208, the one or more controllers 20 instruct the graphic projection module 22 to generate the vertical alignment graphic 62 (seen in FIG. 2A) upon the windscreen 12 of the vehicle 14 based on the eye location of the driver 18, where the vertical alignment graphic 62 indicates when the eye location of the driver 18 is positioned at the nominal height N of the eyebox 50 (FIG. 3). The method 200 may then proceed to decision block 210.

In decision block 210, the one or more controllers 20 continue to monitor the eye location of the driver 18 until the eye location of the driver 18 is positioned at the nominal height N of the eyebox 50 (FIG. 3). As mentioned above, the driver 18 adjusts his or her vertical height by adjusting the seat height position. Once the eye location of the driver 18 is at the nominal height N of the eyebox 50, the method 200 may then proceed to block 212.

In block 212, in response to determining the eye location of the driver 18 is at the nominal height N of the eyebox 50 (FIG. 3), the one or more controllers 20 instruct the graphic projection module 22 to generate the horizontal alignment graphic 64 (FIG. 2B) upon the windscreen 12 of the vehicle 14 based on the eye location of the driver 18, where the horizontal alignment graphic 64 indicates when the eye location of the driver 18 is positioned at the horizontally oriented center C of the eyebox 50 (FIG. 3). The method 200 may then proceed to decision block 214.

In decision block 214, the one or more controllers 20 continue to monitor the eye location of the driver 18 until determining the eye location of the driver 18 is positioned at the horizontally oriented center C of the eyebox 50 (FIG. 3). Once the eye location of the driver 18 is at the horizontally oriented center C of the eyebox 50, the method 200 may then proceed to block 216.

In block 216, the one or more controllers 20 instruct the head-down display 40 to display one or more boresighting controls 68 (FIG. 4A) upon the screen 66. The method 200 may then proceed to block 218.

In block 218, the one or more controllers 20 instruct the graphic projection module 22 to generate the boresight graphic 70 upon the windscreen 12 of the vehicle 14 (seen in FIGS. 5A and 5B). The method 200 may then proceed to decision block 220.

In decision block 220, the driver 18 continues to manipulate the boresighting controls 68 (FIG. 4A) until the curved underside profile 72 of the boresight graphic 70 is aligned with the curvature 74 of the steering wheel 60 (FIGS. 5A and 5B). The one or more controllers 20 then save one or more boresight parameters in memory. The method 200 may then proceed to block 222.

In block 222, the one or more controllers 20 then instruct the graphic projection module 22 to generate a graphic instructing the driver 18 to move the steering wheel 60 downwards from the upmost position. The one or more controllers 20 also instruct the head-down display 40 to display one or more calibration controls 86 (FIG. 4B) upon the screen 66. The method 200 may then proceed to block 224.

In block 224, the one or more controllers 20 instruct the graphic projection module 22 to generate the one or more distortion graphics 80 upon the windscreen 12 of the vehicle 14 (shown in FIG. 6). The method 200 may then proceed to decision block 226.

In decision block 226, the driver 18 continuously performs distortion compensation adjustment by adjusting the shape of the distortion graphic (FIG. 6) to remove distortions by manipulating the one or more calibration controls 86 (FIG. 4B). Once the distortions are removed from the distortion graphic the shape of the distortion graphic 80 is finalized and translated into one or more distortion parameters. As mentioned above, the driver 18 may perform distortion compensation on more than one distortion graphic 80. The method 200 may then proceed to block 228.

In block 228, the one or more controllers 20 determine the distortion compensation value based on the distortion parameters corresponding to each distortion graphic 80 (FIG. 6). The one or more controllers 20 may then calculate the calibration map based on the distortion compensation value. The method 200 may then proceed to block 230.

In block 230, the one or more controllers 20 then determine the reward that is assigned to the driver 18 for completing the calibration of the head-up display system 10. The method 200 may then terminate.

Referring generally to the figures, the disclosed head-up display system provides various technical effects and benefits. Specifically, the disclosure provides an approach to calibrate the head-up display system at a dealership, or by a customer of the vehicle instead of at the final assembly plant. This in turn reduces the overall cost associated with the vehicle. Furthermore, the disclosed approach also provides rewards to a driver for calibrating the head-up display. The reward provides a gamified experience that motivates and engages the driver.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A head-up display system for displaying graphics upon a windscreen of a vehicle to provide a driver with a gamified experience, the head-up display system comprising:
   a driver monitoring system including one or more cameras that determine a location of a head of the driver of the vehicle and an eye location of the driver;
   a graphic projection module for generating images upon the windscreen of the vehicle; and
   one or more controllers in electronic communication with the driver monitoring system and the graphic projection module, wherein the controller executes instructions to:
   receive a user-generated prompt indicating a calibration mode of the head-up display system is initiated;
   in response to receiving the user-generated prompt, initiate the calibration mode;
   receive an eye location indicator from the driver monitoring system indicating the eye location of the driver and determine the eye location of the driver; and
   instruct the graphic projection module to generate a vertical alignment graphic upon the windscreen of the vehicle, wherein the vertical alignment graphic indicates when the eye location of the driver is positioned at a nominal height of an eyebox of the head-up display.

2. The head-up display system of claim 1, wherein the vertical alignment graphic is a horizontally aligned arrow that changes color to indicate when the eye location of the driver is at the nominal height of the eyebox.

3. The head-up display system of claim 1, wherein the one or more controllers execute instructions to:
   in response to determining the eye location of the driver is at the nominal height of the eyebox, generate a horizontal alignment graphic upon the windscreen of the vehicle based on the eye location of the driver.

4. The head-up display system of claim 3, wherein the horizontal alignment graphic indicates when the eye location of the driver is positioned at a horizontally oriented center of the eyebox.

5. The head-up display system of claim 1, wherein the one or more controllers execute instructions to:
   instruct the graphic projection module to generate a boresight graphic upon the windscreen of the vehicle, wherein the boresight graphic includes a curved underside profile that follows a curvature of a steering wheel.

6. The head-up display system of claim 5, wherein the boresight graphic includes one or more arrows that indicate a direction in that the boresight graphic is to be moved to in order to align the curved underside profile of the boresight graphic with the curvature of the steering wheel.

7. The head-up display system of claim 5, wherein the boresight graphic changes color to indicate when the eye location of the driver is not at a horizontally oriented center of the eyebox.

8. The head-up display system of claim 1, wherein the one or more controllers execute instructions to:
   instruct the graphic projection module to generate one or more distortion graphics upon the windscreen of the vehicle.

9. The head-up display system of claim 8, further comprising a head-down display including a screen, wherein the head-down display is in electronic communication with the one or more controllers.

10. The head-up display system of claim 9, wherein the one or more controllers execute instructions to:
instruct the head-down display to display one or more calibration controls upon the screen.

11. The head-up display system of claim 10, wherein the driver performs distortion compensation adjustment by adjusting a shape of a distortion graphic to remove distortions by manipulating the one or more calibration controls.

12. The head-up display system of claim 10, wherein the driver performs distortion compensation on more than one distortion graphic.

13. The head-up display system of claim 12, wherein the one or more controllers execute instructions to:
determine a distortion compensation value based on distortion parameters corresponding to each distortion graphic.

14. The head-up display system of claim 12, wherein the more than one distortion graphic includes one or more of the following: a trapezium distortion graphic, a cushion distortion graphic, a smile distortion graphic, a shear distortion graphic, an asymmetrical shear horizontal right distortion graphic, an asymmetrical cushion horizontal right distortion graphic, an asymmetrical shear horizontal left distortion graphic, and an asymmetrical cushion horizontal left distortion graphic.

15. The head-up display system of claim 1, wherein the one or more controllers execute instructions to:
determine a reward that is assigned to the driver for completing calibration of the head-up display system, wherein the reward is in the form of brand incentive points.

16. A vehicle, comprising:
a windscreen; and
a head-up display system for displaying graphics upon the windscreen of a vehicle to provide a driver with a gamified experience, wherein the head-up display system comprises:
a driver monitoring system including one or more cameras that determine a location of a head of the driver of the vehicle and an eye location of the driver;
a graphic projection module for generating images upon the windscreen of the vehicle; and
one or more controllers in electronic communication with the driver monitoring system and the graphic projection module, wherein the controller executes instructions to:
receive a user-generated prompt indicating a calibration mode of the head-up display system is initiated;
in response to receiving the user-generated prompt, initiate the calibration mode;
receive an eye location indicator from the driver monitoring system indicating the eye location of the driver and determine the eye location of the driver; and
instruct the graphic projection module to generate a vertical alignment graphic upon the windscreen of the vehicle, wherein the vertical alignment graphic indicates when the eye location of the driver is positioned at a nominal height of an eyebox of the head-up display.

17. A method for displaying graphics upon a windscreen of a vehicle by a head-up display system to provide a driver with a gamified experience, the method comprising:
receiving, by one or more controllers, a user-generated prompt indicating a calibration mode of the head-up display system is initiated;
in response to receiving the user-generated prompt, initiating the calibration mode;
receiving, by the controller, an eye location indicator from a driver monitoring system indicating an eye location of the driver and determining the eye location of the driver, wherein the driver monitoring system includes one or more cameras that determine the location of a head of the driver of the vehicle and the eye location of the driver;
instructing a graphic projection module to generate a vertical alignment graphic upon the windscreen of the vehicle, wherein the vertical alignment graphic indicates when the eye location of the driver is positioned at a nominal height of an eyebox of the head-up display; and
in response to determining the eye location of the driver is at the nominal height of the eyebox, generating a horizontal alignment graphic upon the windscreen of the vehicle based on the eye location of the driver.

18. The method of claim 17, further comprising:
instructing the graphic projection module to generate a boresight graphic upon the windscreen of the vehicle, wherein the boresight graphic includes a curved underside profile that follows a curvature of a steering wheel.

19. The method of claim 17, further comprising:
instructing the graphic projection module to generate one or more distortion graphics upon the windscreen of the vehicle.

20. The method of claim 17, further comprising:
determining a reward that is assigned to the driver for completing calibration of the head-up display system, wherein the reward is in the form of brand incentive points.

* * * * *